United States Patent
McKechnie

(10) Patent No.: US 8,232,237 B2
(45) Date of Patent: Jul. 31, 2012

(54) ARTICLE AND METHOD

(75) Inventor: Malcolm Tom McKechnie, Hull (GB)

(73) Assignee: Reckitt Benckiser (UK) Limited, Slough, Berkshire (GB)

( * ) Notice: Subject to any disclaimer, the term of this patent is extended or adjusted under 35 U.S.C. 154(b) by 1096 days.

(21) Appl. No.: 10/574,423

(22) PCT Filed: Sep. 13, 2004

(86) PCT No.: PCT/GB2004/003900
§ 371 (c)(1),
(2), (4) Date: Dec. 1, 2006

(87) PCT Pub. No.: WO2005/041740
PCT Pub. Date: May 12, 2005

(65) Prior Publication Data
US 2007/0131248 A1 Jun. 14, 2007

(30) Foreign Application Priority Data
Oct. 10, 2003 (GB) .................................. 0323754.2

(51) Int. Cl.
*C11D 17/04* (2006.01)
*C11D 3/12* (2006.01)
(52) U.S. Cl. ........ 510/438; 510/439; 510/108; 510/180; 510/243; 510/507
(58) Field of Classification Search .................. 510/438, 510/439, 108, 507, 180, 243
See application file for complete search history.

(56) References Cited

U.S. PATENT DOCUMENTS

| | | | | |
|---|---|---|---|---|
| 3,889,804 | A * | 6/1975 | Ravich | 206/221 |
| 4,626,550 | A * | 12/1986 | Hertzenberg | 514/770 |
| 4,820,439 | A | 4/1989 | Rieck | |
| 5,486,410 | A | 1/1996 | Groeger et al. | |
| 5,498,478 | A * | 3/1996 | Hansen et al. | 428/372 |
| 6,183,766 | B1 * | 2/2001 | Sine et al. | 424/405 |
| 6,267,975 | B1 * | 7/2001 | Smith et al. | 424/401 |
| 6,322,801 | B1 * | 11/2001 | Lorenzi et al. | 424/402 |
| 6,412,634 | B1 * | 7/2002 | Telesca et al. | 206/494 |
| 6,503,136 | B1 | 1/2003 | Rose et al. | |
| 2002/0032135 | A1 * | 3/2002 | Verdrel-Lahaxe et al. | 510/136 |
| 2002/0107156 | A1 * | 8/2002 | Shaw et al. | 510/130 |
| 2002/0174863 | A1 | 11/2002 | Saric et al. | |
| 2004/0062798 | A1 * | 4/2004 | Lukenbach et al. | 424/465 |
| 2004/0063603 | A1 * | 4/2004 | Dave et al. | 510/438 |

FOREIGN PATENT DOCUMENTS

| | | |
|---|---|---|
| AU | 9215012 A | 11/1993 |
| EP | 384070 | 8/1990 |
| EP | 1 156 152 A | 11/2001 |

(Continued)

OTHER PUBLICATIONS

Patent Abstracts of Japan, vol. 2003, No. 01, Jan. 14, 2003—& JP 2002 275050 A (Kanebo Ltd), Sep. 25, 2002 abstract.

(Continued)

*Primary Examiner* — Lorna M Douyon
(74) *Attorney, Agent, or Firm* — Norris McLaughlin & Marcus PA

(57) ABSTRACT

A cleaning article comprises a substrate in the form of a wipe loaded with a cleaning agent and loaded with a heat generating agent which generates heat when the wipe is exposed to water.

21 Claims, 2 Drawing Sheets

FOREIGN PATENT DOCUMENTS

| | | | |
|---|---|---|---|
| FR | 2 801 500 A | | 6/2002 |
| GB | 543 736 A | | 3/1942 |
| GB | 1429143 | | 3/1976 |
| JP | 7 231870 A | | 9/1995 |
| JP | 2002 275050 A | | 9/2002 |
| JP | 2003 284659 A | | 10/2003 |
| WO | WO 92/06151 | | 4/1992 |
| WO | WO 01/26528 | A1 | 4/2001 |

OTHER PUBLICATIONS

Patent Abstracts of Japan, vol. 2003, No. 12, Dec. 5, 2003 & JP 2003 284659 A (Kao Corp), Oct. 7, 2003 abstract.

Patent Abstracts of Japan, vol. 1996, No. 01, Jan. 31, 1996 & JP 7 231870 A (Kyowa Sangyo KK), Sep. 5, 1995 abstract.

Glastechn. Ber. 37, 194-200 (1964).

Zeitschrift fur Kristallogr. 129, 396-404 (1969).

Bull. Soc. Franc. Min. Crist., 95, 371-382 (1972).

Amer. Mineral, 62, 763-771 (1977).

Kirk-Othmer, Encyclopedia of Chemical Technology, 4th Ed., vol. 23, pp. 478-541.

WPI abstract accession No. 2003-753055 [71] & JP2003284659A—Jul. 10, 2003 [Kao Soap] and the machine translation thereof supplied [see flagged, highlighted passages].

English-language translation of JP 7-231870, Sep. 5, 1995.

* cited by examiner

ARTICLE AND METHOD

The present application is an application filed under 35 USC 371 based on PCT/GB2004/003900.

The present invention relates to a cleaning article which comprises a substrate, for example a wipe, which can be used for cleaning the surface of an inanimate object.

Many cleaning activities are performed using cold water and compared to similar operations carried out with warmer water the performance may be less satisfactory. It is known that as a general rule the rate of chemical or physical cleaning processes approximately doubles for each 10° C. rise in temperature. In addition the feeling of warmth to the user provides reassurance that there is effective cleaning. However, it is not always possible to have access to a source of warm water when cleaning. Attempts have been made to provide cleaning articles comprising a heat generating agent in order to provide a source of heat for a cleaning operation. However, such cleaning articles have been relatively complex in construction. For example, they may employ rupturable pouches, adding to their cost and reducing their suitability for many cleaning operations. Accordingly, the present invention aims to provide a cleaning article of simple construction which has the ability to generate heat, in use.

According to a first aspect of the present invention there is provided a cleaning article comprising a substrate loaded with a cleaning agent and with a heat generating agent, wherein the cleaning article is adapted for cleaning a surface of an inanimate object and wherein the heat generating agent generates heat when exposed to water.

By "substrate loaded with a cleaning agent and loaded with a heat generating agent" it is meant that the agents are applied to the surface of the substrate and/or entrained within the substrate. For example, the substrate may be impregnated by the agents. The cleaning agent and heat generating agent are thus arranged such that the cleaning article as manufactured is in a state in which said agents are in fluid contact, i.e. by gas, vapour or liquid, with the ambient surroundings, such that the cleaning agent and heat generating agent are immediately accessible to water in the form of gas, vapour or liquid in contact with the substrate.

Therefore, there is no need for a user to take any special measures to trigger the heat generation; for example to rupture a pouch containing the heat generating agent. Mere contact with water—for example by immersion—is the only step needed to trigger the heat generation.

Likewise there is preferably no need for a user to take any special means to provide or release the cleaning agent, for example to rupture a pouch thereof. Preferably, mere contact with water—for example by immersion—is the only step needed to provide or release the cleaning agent.

Figure 1:
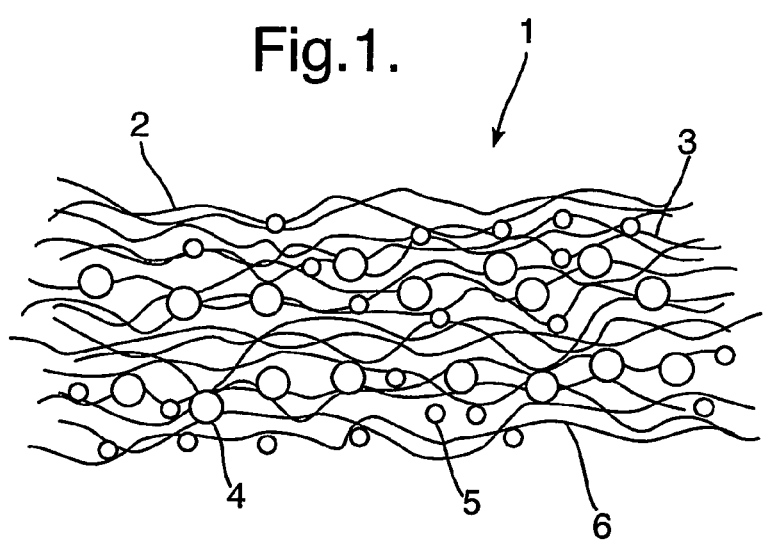
FIG. 1 is a cross-sectional view of a cleaning article.

In use, the cleaning article is contacted with water and a target surface of an object is then contacted with the cleaning article, which is typically wiped across the surface. The cleaning article thereby cleans the surface.

Suitably, the cleaning article is contained within a substantially hermetically sealed environment until such time as it is desired to employ the article in a cleaning operation. The cleaning article is suitably sealed prior to use in a substantially sealed container, preferably it is watertight and airtight. Thus, premature activation of the heat generating agent may be substantially avoided.

The heat generating agent is arranged to generate heat when exposed to water which may be in the form of liquid or vapour. Preferably, the heat generating agent is arranged to generate heat when exposed to liquid water. Suitably, the substrate is loaded with the heat generating agent such that the heat generating agent can be readily contacted by liquid water when desired.

The amount of heat generated will vary according to the agent(s) used, their accessibility to water, the size and type of the cleaning article, and the source and amount of water. It is within the ability of the skilled person to discover by simple empirical testing the limitations in each of the variables, and in any event to design a substrate yielding a useful temperature increase.

Temperature can be easily measured by placing the cleaning article immediately after first contact with water into an appropriately dimensioned glass beaker insulated from heat loss by a polystyrene container sleeve and having an insulated lid. A thermometer can be held in place through the insulated lid and the tip of the thermometer being held in intimate contact with the cleaning article.

Suitably, the cleaning article is arranged such that it can be briefly dipped in a body of water and/or placed under running water for a brief period to initiate heat production. Suitably, the water-contacted cleaning article is arranged to increase in temperature by an amount perceivable to a user but not to exceed a temperature at which is safe for a user to hold the cleaning article without taking any special precautions. Suitably, the temperature increase improves the efficiency with which the cleaning article cleans the surface of an object. Suitably, the temperature increase of the cleaning article is at least 1° C., preferably at least 3° C., more preferably at least 5° C., and most preferably at least 8° C. Suitably, the maximum temperature of the cleaning article does not exceed 55° C., and preferably does not exceed 50° C. Most preferably it does not exceed 45° C. Suitably, the temperature increase of the cleaning article does not exceed 30° C., and preferably does not exceed 20° C.

Suitably, the cleaning article is arranged such that heat production is initiated when it is immersed in a body of liquid water. Suitably, the cleaning article is arranged such that upon immersion in a body of water having a volume of 2 liters which is at ambient temperature of 20° C. it causes a temperature increase thereof of at least 1° C., preferably at least 3° C. Suitably, the temperature increase does not exceed 40° C., and preferably does not exceed 20° C.

Suitably, the cleaning article and/or water in which it is immersed is arranged such that the temperature thereof remains at an increased temperature—preferably a temperature as stated in the above definitions—for at least 5 minutes, preferably at least 10 minutes, more preferably for at least 20 minutes, for example for 30 minutes or more. For example, in one preferred embodiment a cleaning article soaked in water but not immersed in water and lightly wrung so as not to drip water, experiences a temperature increase of at least 5° C., which lasts for at least 10 minutes.

The cleaning article preferably allows for cleaning operations to be performed that leave the cleaned object substantially "streak free" (that is, free of visible deposits, such as smears).

Suitably, the heat generating agent is carried by the substrate such that it remains attached thereto and is not deposited on an object during a cleaning operation.

Suitably, the cleaning article can be employed in a one stage cleaning process without the need to subsequently rinse the cleaned object to remove residue—in particular heat generating agent—left by the cleaning article. Thus, suitably there is no release of heat generating agent and the cleaning agent it is preferably of a type which leaves no streaks or other visible deposits.

Generation of heat by the heat generating agent can be by any one of a number of chemical or physical processes, such as by an exothermic chemical reaction with water or by a physico-chemical process, for example, by hydration (heat of hydration).

Preferably the heat generating agent is substantially insoluble in water. By "substantially insoluble in water" we mean that less than 0.1 g dissolves in 20 ml of water at 45° C. Preferably the heat generating agent is substantially insoluble in water in its own right, which is preferred, or is rendered substantially insoluble in water by being bound to the cleaning article, either directly or indirectly.

Suitable heat generating agents for the generation of heat involving a physico-chemical process include dehydrated salts or minerals which upon exposure to water, generate heat. A preferred heat generating agent is a dehydrated salt, mineral or a mixture thereof, and includes, aluminosilicate, such as zeolite, aluminium oxide, calcium oxide and clay. By the term "dehydrated", we include agents which are partially hydrated but are capable of generating heat upon further hydration.

Preferably, the salt or mineral has a particle size of about 0.1-100 microns in diameter.

A preferred synthetic aluminosilicate useful herein are available under the designations Zeolite A, Zeolite P, and Zeolite X. Natural zeolites include analcite, chabazite, heulandite, stilbite, fayisite, natrolite and thomsite can also be used. In an especially preferred embodiment, is presented a crystalline aluminosilicate material of the formula:

$$Na_{12}[(AlO_2)_{12}(SiO_2)_{12}].xH_2O$$

wherein x is from about 20 to about 30, especially about 27. This material is known as Zeolite A. Dehydrated zeolites are where x=0-10.

Alkali metal (preferably sodium) aluminosilicates with a general formula:

$$0.8\text{-}1.5Na_2O.Al_2O_3.0.8\text{-}6SiO_2$$

are also preferred. Preferred sodium aluminosilicates within the above formula contain 1.5-3.0 $SiO_2$ units. Both amorphous and crystalline aluminosilicates can be prepared by reaction between sodium silicate and sodium aluminate, as amply described in the literature.

Sodium aluminosilicate are described, for example, in GB 1429143 (Procter & Gamble). The preferred sodium aluminosilicates of this type are the well known commercially available zeolites A and X, and mixtures thereof. Also of interest is zeolite P described in EP 384070 (Unilever).

Another class of compounds are the layered sodium silicate, such as are disclosed in US-A-4820439 and EP-A-551375.

These materials are defined in U.S. Pat. No. 4,820,439 as being crystalline layered, sodium silicate of the general formula:

$$NaMSi_xO_{2x+1}.YH_2O$$

wherein
M denotes sodium or hydrogen,
x is from 1.9 to 4 and Y is from 0 to 15.

Literature references describing the preparation of such materials include Glastechn. Ber. 37, 194-200 (1964), Zeitschrift fiir Kristallogr. 129, 396-404 (1969), Bull. Soc. Franc. Min. Crist., 95, 371-382 (1972) and Amer. Mineral, 62, 763-771 (1977). Also covered are salts of zinc or any other salt which is ion exchanged with any of the above silicates.

The substrate may be any material capable of being loaded with a cleaning agent and heat generating agent and may be porous, absorbent and/or fibrous in structure. The substrate preferably comprises a sheet material, preferably a fibrous sheet material. The sheet material may comprise a fibrous web or mat.

Preferably, the cleaning article substrate comprises a cloth or a sponge. A suitable cloth may include a thin cloth commonly called a wipe.

The substrate could in principle be a woven sheet, but is preferably non-woven. Suitable non-woven sheet materials may include melt blown, coform, air-laid, bonded-carded web materials, hydroentangled materials and combinations thereof.

Suitable sheet materials may include polyesters, polyamides, polyvinyl alcohols, cellulosics (for example rayon, viscose) and nylon, or mixtures thereof for example. The sheet material may alternatively comprise natural fibres, such as cotton, linen, flax and wool, or mixtures thereof, for example. The sheet material may comprise a mixture of synthetic and natural fibres.

Suitably the sheet material is comprised of synthetic fibres formed into a web, mat or similar flexible sheet-form substrate. The sheet material may be a laminar composite material of layers of non-woven fibres, woven fibres or mixtures thereof which layers may comprise the same or different materials. Preferably, however, a sheet material is a monolayer.

Preferred sheet materials comprise fibres of polyester or cellulose, including viscose and rayon. The sheet material may be a non-woven fibrous sheet material comprising cellulose and/or synthetic polymer fibres. The sheet material may be a non-woven fibrous sheet material comprising composite fibres. The composite fibres may comprise polyester and polyamides.

Preferably, the substrate is a nonwoven sheet material made from a cellulose or polymer fibre or a mixture of both. Preferably, a dehydrated silicate, preferably an aluminosilicate, is bound to the substrate, as heat generating agent. An example of such a cleaning article, but wherein the aluminosilicate, in this case a zeolite, is hydrated is supplied by BFF Non-wovens Ltd of Bridgewater, U.K. It will be appreciated that a dehydrated silicate-loaded nonwoven cleaning article can be produced by ensuring that during its manufacture dehydrated silicate is used and at no stage during its manufacture is it exposed to moisture. Alternatively cleaning articles may be produced and the silicate dehydrated after manufacture by exposing the cleaning article to elevated temperature, suitably above 150° C. Lower temperatures can be used if the pressure is reduced. Such cleaning articles are then packaged into a sealed container soon after manufacture to prevent premature hydration prior to use.

Nonwoven cloths or wipes are generally manufactured by the same technique whereby the fibres are laid and then fixed together. Laying of the fibres is usually by one of three techniques, dry laid, spun laid or wet laid (clearly wet laid is not suitable unless the cloth or wipe is dehydrated after manufacture); bonding of the fibres may be by chemical or physical means, such as, heat, pressure, chemically, friction or a combination thereof.

Suitably, the article comprises from 1% to 80%, preferably from 5% to 60%, more preferably from 10% to 50% by weight of the heat generating agent.

Suitably, the article comprises from 0.0001% to 5% by weight of cleaning agent, preferably from 0.0001 to 1%.

Typically, the substrate material (dry) when in the form of a sheet or wipe has a weight of from 10 to 150 grams per square meter ($g/m^2$), preferably 20 to 80 $g/m^2$, more preferably 30 to 70 $g/m^2$, most preferably 40 to 60 $g/m^2$.

Preferably, the article has an area in the range of 100 to 1600 $cm^2$, more preferably 225 to 1225 $cm^2$. When the article is a rectangular sheet it may be of the range of 10 to 40 cm by 10 to 40 cm, more preferably in the range 15 to 35 cm×15 to 35 cm.

Preferably, the loading of the heat generating agent of the substrate when in the form of a sheet or wipe is in the range of 0.5 to 160 $g/m^2$, preferably 5 to 130 $g/m^2$, preferably 10 to 90 $g/m^2$, more preferably 25 to 60 $g/m^2$, most preferably 30 to 50 $g/m^2$.

Preferably, the loading of the cleaning agent on the substrate when in the form of a sheet or wipe is in the range of 0.5 to 160 $g/m^2$, preferably 5 to 130 $g/m^2$, preferably 10 to 90 $g/m^2$, more preferably 25 to 60 $g/m^2$, most preferably 30 to 50 $g/m^2$.

Preferably, the combined loading of the heat generating agent and cleaning agent on the substrate when in the form of a sheet or wipe does not exceed 150 $g/m^2$, more preferably 100 $g/m^2$.

Preferably, the substrate can absorb and retain between 0.1 and 6 times its weight of water, more preferably between 0.5 and 4 times. Preferably, the substrate can absorb at least its own weight of water, preferably between 1 and 3 times its own weight, more preferably between 1.5 and 2.5 times, and most preferably between 1.8 and 2.2 times.

Suitably, the substrate is loaded with a weight of the heat generating agent which is between 0.01 and 1 times the amount of heat generating agent needed to react with the amount of water the substrate is capable of absorbing. Preferably, the substrate carries the heat generating agent in an amount equal to between 0.1 and 0.8 times the amount of water the substrate is capable of absorbing, preferably between 0.2 and 0.6 times, more preferably between 0.3 and 0.5 times.

The heat generating agent may be provided in particulate form. Particle sizes may depend on the material selected but will typically be between about 0.1 µm to about 300 µm, preferably up to about 75 µm, and preferably not less than 1 µm, more preferably not less than 25 µm, these values being nominal (mean) diameters.

The heat generating agent may be bound to the substrate. Suitably, in use shedding of the heat generating agent is inhibited, preferably substantially avoided. By the use of the term "bound" is included impregnation. Impregnation may be achieved by mixing the agent with the fibres during the manufacture of the cleaning article, by spraying the agent onto the cleaning article, as a solution or as a powder, or during any calendering process of the nonwoven introducing the agent. Adhesive binding of the agent to the cleaning article can be by spray coating the agent onto the cleaning material with an adhesive carrier, for example, latex. Alternatively, the agent may be mechanically bound by being held between two or more layers, for example two or more layers of a nonwoven which are sealed at the edges. However, such mechanical binding is not preferred; preferred methods such as binding by impregnation and adhesive binding, and particularly binding by mechanical entanglement of solid particles of heat generating agent within the fibres of the cloth or wipe, are able to achieve an even distribution of the heat generating agent over the cleaning article.

Suitably the heat generating agent is retained or impregnated within the sheet material, preferably using a fixing agent, and whereby in use shedding of the heat generating agent is inhibited, preferably substantially avoided.

Suitably a fixing agent when used comprises a binder, and preferably a film-forming agent. Suitable binders include a latex, such as an acrylics or styrene butadiene latex or natural rubber based binder, especially containing a film former and/or an anti-foaming agent. The term film former means a material capable of forming a film when dry at ambient temperature and pressure. Suitable film-formers include polyvinyl alcohol or polyvinyl alcohol/vinyl acetate copolymers, and quaternary ammonium salts of polyvinylpyrrolidone/vinyl acetate copolymers.

Suitably impregnation of the sheet material with the heat generating agent is carried out using a heat generating agent—containing liquid preferably also comprising a fixing agent, by any one or more of the following methods:

saturation by soaking in a convenient manner e.g. simply delivery of the appropriate chemical treatment liquor from a hose over the sheet material;

impregnation by immersion of the sheet material in a bath of the treatment liquor; forced impregnation into the sheet material by application of the liquor under pressure;

pouring of the treatment liquor over the sheet material by a curtain-coating device situated over a progressively advancing web of sheet material to drench the sheet material;

spraying the treatment liquor upon the fibrous material;

or an equivalent treatment of a web or mat of the sheet material.

Suitably the fixing agent when used comprises at least 5% by weight of the total weight of the article, preferably at least 10%, more preferably at least 15% yet more preferably at least 20% and most preferably at least 25%.

Suitably the fixing agent when used comprises 60% or less by weight of the total weight of the article, preferably 50% or less, more preferably 45% or less, and most preferably up to 40% or less.

The substrate incorporating a heat generating agent may be as described in WO 98/303026 (BFF) with the absorbent material described in that patent application being substituted by a heat generating agent.

The cleaning article may comprise a substrate having a composite fibre matrix loaded with immobilized heat generating agent particulate. The composite fibres may comprise concentric sheath-core fibres. Alternatively, the composite fibres may comprise eccentric sheath-core fibres or fibres having a side-by-side configuration, such fibres are known as bicomponent or heterofil fibres. Suitably, the heat generating agent comprises a zeolite as hereinbefore described. Suitably, the heat generating agent is distributed in the interior of the fibrous structure in three dimensions and fused to a low melting component of the composite fibres. This may be achieved without substantially reducing the available surface area of the heat generating agent. Suitably, the immobilising matrix or web is open for entrapment of heat generating agent. The web may be generally uniform, and the heat generating agent may be distributed in three dimensions within the web without substantially extending into the upper and lower surfaces. Suitably, the particles of the heat generating agent are entrapped in interstices of the web structure, which is thermally bonded at the cross over points of individual fibres. In this way, migration of the particles out of the web may be substantially precluded.

The substrate may further include a microfibre web in contact with the thermally bonded, particulate-containing web. The composite substrate suitably comprises a structure-forming component and a thermally-bondable, polymeric component. Suitably, the structure-forming component provides high structural integrity even when highly loaded with heat generating agent particulate and the thermally-bondable component has high bonding capability for fusion bonding of the heat generating agent particulate to the fibrous matrix.

The substrate may comprise a fibre matrix loaded with immobilized particles as described in U.S. Pat. No. 5,486,410.

With a substrate of fibrous structure, the fibrous structure may be dry formed. Dry forming is advantageous in forming a generally uniform structure, compared to a web structure formed from blown or melt blown fibre. Accordingly, by "generally uniform" is meant, a structure of greater uniformity than a randomly collected web formed from blown or melt blown fibre. In addition, a melt blown, collected web would have significantly higher pressure drop and would therefore be generally undesirable for use as the fibre matrix.

Moreover, dry forming may advantageously provide for controlled introduction, spacing and immobilisation of dissimilar matter such as heat generating agent, with tortuous paths in the particulate-loaded structure for air or fluid flow. Alternatives may be less beneficial for achieving the foregoing results but useful for other purposes and these may be wet forming and spun bonding.

The substrate incorporating the heat generating agent may be formed in a dry forming process for making a fibrous structure in which a carding machine cards crimped, composite fibre and forms a first non-woven web on an endless moving belt. Then a non-woven, microfibre web may be deposited onto the web. The microfibre web may be applied from a roll or formed on the first web. Thereafter, additional crimped, composite fibre may be carded and a second non-woven web formed on the microfibre web.

Heat generating agent may be applied to the first web from, for instance, a shaker. The web is open to an appropriate degree and the heat generating agent is of appropriate size and weight to become entrapped in the interior of the web. Also affecting distribution and entrapment of the heat generating agent is the denier of the fibres of the web. The particulate matter may be heated or cold. An inclined ramp may be used, and concentration of the heat generating agent within the web may be controlled by adjusting the angle of the supporting ramp.

Thereafter, additional crimped, composite fibre may be carded to form a third non-woven web onto the particulate-loaded web. Heat generating agent is applied to and entrapped by the third web. Addition of the heat generating agent in more than one layer typically improves uniformity of distribution. Subsequently, additional crimped, composite fibre may be carded, and a fourth non-woven web may be formed therefrom on the third particulate-loaded web. If desired, further webs may be preformed.

Thermal bonding may be carried out at a sufficient elevated temperature less than the melting point of the structural fibre component and particulate matter present and for a suitable period of time to melt the heat-bondable component and provide adequate flow for the heat-bondable component to act as an adhesive for bonding. Selection of a relatively higher thermal bonding temperature generally requires a relatively shorter exposure time, whereas selection of a relatively lower temperature usually requires a relatively longer exposure time. Treatment conditions that result in too much flow of the heat-bondable component or in structural degradation are to be avoided. The structure is thereafter cooled to below the resolidification or softening temperature of the heat-bondable component to form bonds.

Then, heat "delivered" as infra-red radiation may be applied to the entire structure to provide for melt bonding of the composite fiber matrices and fusion of particulate to the matrix structure.

Formation of a unitary structure is also advantageously accomplished. Other sources of heat may be used, for example by contact—for example calendaring—or by convection—for example hot air stentering.

The cleaning agent is one or more of surfactants (meaning molecules comprising a hydrophilic head group and a hydrophobic tail), bleaches, enzymes, fungicidesor germicides. The cleaning agent may also be an agent for improving soil removal and wetting and surface characteristics, such as sodium tripolyphosphate or EDTA, as known to those skilled in the art. The cleaning agent may also be a solvent which is water-free (meaning comprising less than 0.1% by weight of water). Suitable solvents include lower alcohols such as ethanol or isopropyl alcohol, glycol ethers and hydrocarbons such as alkanes. Optionally, additional ingredients such as pH buffering agents, anti-foamer, hydrotropes, anti-oxidants, anti-corrosion agents, or any other beneficial agent may be included in the article along with the cleaning agent.

Preferably, the cleaning agent comprises a surfactant.

Suitable surfactants include:

a) polyethylene oxide condensates of alkyl phenols, having a straight or branched alkyl of from about 6 to about 12 carbon atoms, with ethylene oxide wherein the amount of ethylene oxide present is from about 3 to about 25 moles per mole of alkyl phenol;

(b) condensation products of aliphatic alcohols with ethylene oxide of the formula $R^*O(C_2H_4O)_n H$, wherein $R^*$ is straight or branched alkyl having from about 8 to about 22 carbon atoms and n is 3 to 40;

(c) polyoxyethylene polyoxypropylene block polymers; and (d) fluorinated surfactants such as, for example, anionic, nonionic, cationic and amphoteric fluorosurfactants marketed by E. I. Dupont de Nemours and Company under the trademark ZONYL™, e.g. ZONYL™ FSK, an amphoteric fluorosurfactant, ZONYL™ FSN, a fluorosurfactant, ZONYL™ FSJ, an anionic fluorosurfactant and ZONYL™ FSC, a cationic fluorosurfactant.

Such surfactants as described above are particularly preferred as they tend not to leave streaks when the cleaning article is used on a hard surface.

When the cleaning agent comprises a surfactant, the preferred amount of the surfactant(s) employed is from 0.0001 to about 1 weight percent, more preferably from 0.0006 to about 0.03 weight percent, and most preferably from 0.003 to 0.012 weight percent of the cleaning article, loaded with all the agents used, excluding water.

Agents which improve soil removal may, for example, include glycol ethers such as the methyl and ethyl ethers of ethylene glycol, propylene glycol and dipropylene glycol. Such agents can be included up to about 2 percent by weight of the liquid composition. Agents for improving wetting characteristics that may be employed include, for example, low molecular weight glycols such as ethylene glycol and dipropylene glycol, which can be employed in amounts up to about 1 percent by weight of the liquid composition. Agents for improving surface characteristics may include film forming agents such as partially esterfied resins. Such agents may be employed in amounts up to about 1 percent by weight of all the agents used, excluding water.

Particularly preferred cleaning agents are cationic surfactant compounds having germicidal properties and are those which provide a broad antibacterial or sanitizing function. Any cationic surfactant which satisfies these requirements may be used and are considered to be within the scope of the present invention, and mixtures of two or more cationic surface active agents, viz., cationic surfactants may also be used. Cationic surfactants are well known, and useful cationic surfactants may be one or more of those described for example in McCutcheon's Detergents and Emulsifiers, North American Edition, 1998; Kirk-Othmer, Encyclopaedia of Chemical Technology, 4th Ed., Vol. 23, pp. 478-541, the contents of which are herein incorporated by reference.

The cleaning article may additionally be loaded with what we may term as sensory enhancing agent. This may be, for example, a colorant, colour change agent, perfume, fragrance or perfume carrier, moisturising agent (for the user's hands) or agent which produces a sound in use, for example a crackling sound.

According to a second aspect, the present invention provides a packaged product comprising a substantially watertight container preferably having a resealable opening and containing a cleaning article of the first aspect, wherein the container is arranged to accommodate the cleaning article in a dry environment until it is desired to employ the article in a cleaning operation.

Suitably, the container comprises multiple cleaning articles. Suitably, the container is airtight and impermeable to water vapour as well as watertight.

The container may be a tub or a soft-pack in the form of a pouch (hereinafter a "wrap"). Preferably, the container includes a plurality of cleaning articles. Suitably, the articles comprise wipes and the wipes are arranged in a generally folded configuration in a stack so that each wipe can be removed from the container one at a time. Such folded configurations well known to those skilled in the art and include C-folded, Z-folded, quarter-folded configurations and the like. Each wipe may be interfolded with the wipe immediately above and below in the stack of wipes so that the action of withdrawing one wipe raises a part of the wipe underneath it, to assist its removal. Alternatively, the wipes may rest on each other in a stack without being interleaved.

Alternatively, wipes could be wound as a roll and separated by perforated tear zones and the container could be a tub having an opening through which wipes are pulled.

Conveniently the cleaning article is flow wrapped, or wrapped using a form-fill-seal process, in a sealed polymer film covering. Preferably the film is impermeable to water either in liquid or vapour form.

Alternatively, multiple cleaning articles may be held in a single container which has a watertight lid. Suitably, the lid is also airtight. Such a container may be produced by moulding, suitably by injection or blow moulding, a container and lid, preferably there being an air, water vapour and water tight seal, such as made by silicon rubber attached to the lid and/or the container.

According to a third aspect of the present invention there is provided a method of cleaning a surface of an inanimate object with a cleaning article wherein the cleaning article comprises a substrate carrying a cleaning agent and a heat generating agent, arranged to generate heat when exposed to water, and the cleaning article is provided in a substantially watertight resealable container, and wherein the method comprises removing the cleaning article from the container, contacting the cleaning article with water to initiate heat generation by the heat generating agent and subsequently wiping the surface of an inanimate object with the article.

By substantially watertight resealable container, it is meant that the sealed container may be immersed in water for one minute with 1 cm depth of water above the top of the container without ingress of liquid water and that the container may be stored at 20° C. at a relative humidity of 75% for 8 weeks without water vapour ingress.

Suitably, the cleaning article comprises a cleaning article according to the first aspect. Suitably, the cleaning article is provided as a packaged product according to the second aspect.

The method may comprise briefly contacting the article with water to initiate heat generation. The article may be contacted with water by placing it in a stream of flowing water, for example by putting it under a tap. Alternatively, the article may be briefly immersed in a body of water. For example, the article may be immersed for 10 seconds or less.

The method may comprise immersing the article in a body of water for a period of time such that the whole body of water is heated to an extent perceivable by a user. Suitably, for this purpose the article may be immersed for greater than 10 seconds, for example for 20 seconds or more. Suitably, the water is warmed such that it can be employed more efficiently in cleaning operations. Suitably, the article creates a body of warmed water which then forms a stock of warm water from which surplus water can be picked up by the substrate of the cleaning article. The surplus water may then be employed to clean an object and draw dirt deposits therefrom. After being employed to wipe a surface the surplus water may be wrung from the substrate and a fresh supply of surplus water may be picked up from the body of water and employed to further clean the object.

By "surplus water" it is meant any water picked up by the substrate which is additional to that required to react with and/or to hydrate the heat generating agent in order to cause the generation of heat, i.e. surplus water is water which is free to be deposited on an object and/or to pick up dirt deposits from an object.

Suitably, once wiped with a cleaning article the object will be of a clean appearance and will not require a subsequent rinsing operation.

Preferably, the object comprises an article of furniture. Alternatively, the object may comprise a part of a building, for example a window or windowsill. Suitably, the surface comprises a hard surface. Suitably, the cleaning article is used to clean surfaces of glass, wood, plastics and the like.

As illustrated by FIG. 1 a cleaning article 1 comprises a substrate 2 comprising a plurality of intermingled polyester fibres 3, the substrate weight being 50 g/m². Entrained within the substrate are heat generating, zeolitic agent particles 4, said particles being held both by mechanical entanglement and by use of a fixing agent, such that they are not shed by the substrate. Also carried by the substrate are solid cleaning agent, either as film deposition or as particles 5, or both. Some particles are carried upon the outer surface 6 of the substrate and some are entrained within the substrate. Entrained cleaning agent particles 5 may be carried such that they can be shed from the substrate during a cleaning operation.

To perform a cleaning operation the article can be held under a flow of water or immersed in water such that the substrate absorbs water and the heat generating agent particles 4 are contacted by water and the zeolite hydrated to cause the generation of heat. The heated cleaning article can then be wiped across the surface of an object to be cleaned.

The temperature rise is dependant upon the amount of zeolite provided in the cleaning article and the amount of water that the cleaning article is arranged to absorb. Beneficially, the temperature rise has been found to be relatively long lasting.

Table 1 shows the temperature created after a given time period when a 1 cm×1 cm substrate as described above loaded with approximately 1 g of zeolite was immersed in 5 ml of water initially at room temperature. The temperature of the water/substrate together was measured after at intervals from 1 to 60 minutes.

TABLE 1

| Time period/ minutes | Mass zeolite employed/g | Initial temperature/° C. | Temperature at end of time period/° C. | Temperature change/° C. |
|---|---|---|---|---|
| 1 | 1.0015 | 20 | 29 | 9 |
| 5 | 1.0353 | 20 | 30 | 10 |
| 10 | 0.9762 | 20.5 | 30 | 9.5 |
| 15 | 1.0076 | 20.5 | 29.5 | 9 |
| 30 | 1.0449 | 21 | 30.5 | 9.5 |
| 45 | 0.9555 | 20.5 | 28.5 | 8 |
| 60 | 1.0008 | 20.5 | 30 | 9.5 |

Figure 2:
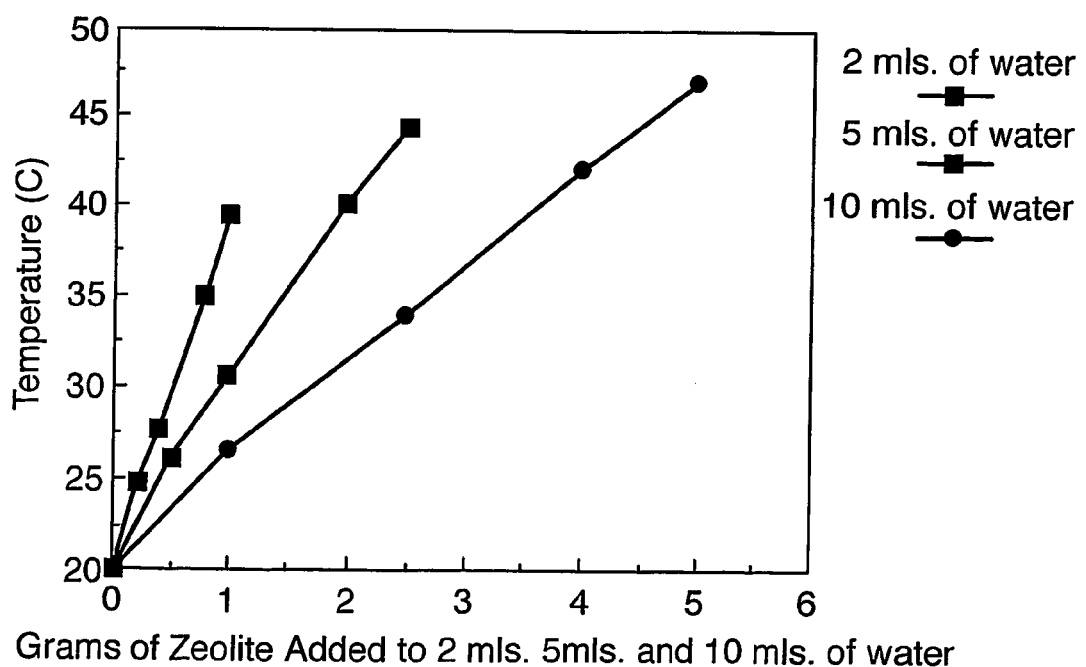
FIG. 2 is a graph showing the effect of adding zeolite on the temperature of water.

The effect of adding a zeolite-loaded substrate on the temperature of different volumes of water is illustrated by FIG. 2.

Figure 3:
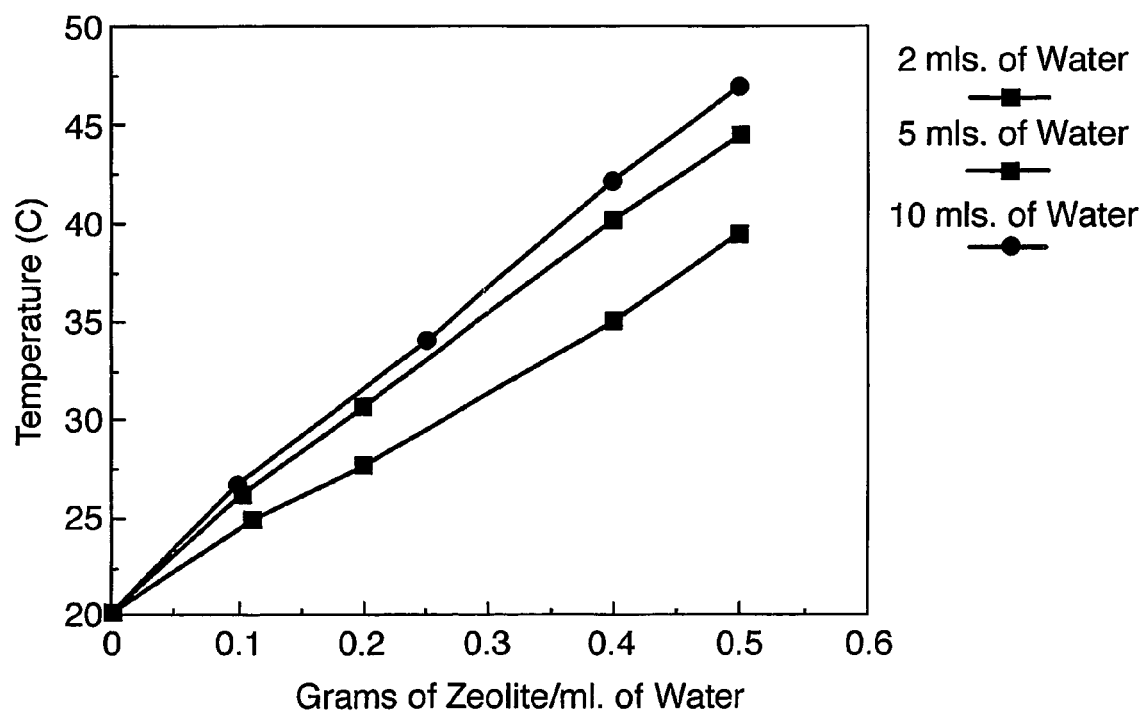
FIG. 3 is a graph showing the relationship between zeolite hydration and temperature.

The relationship between zeolite hydration and temperature is further illustrated by FIG. 3.

The invention claimed is:

1. A cleaning article comprising a substrate of fibrous structure having entrained or impregnated within the substrate a cleaning agent, a heat generating agent, and a fixing agent, wherein the cleaning article is adapted for cleaning a surface of an inanimate object and wherein the heat generating agent generates heat when exposed to water, wherein the loading of the cleaning agent on the substrate is from 0.5 to 160 grams/m$^2$ and wherein the cleaning article comprises from 0.0001% to 1% by weight of cleaning agent which comprises one or more surfactants in an amount from 0.0001% to 0.03% by weight of the cleaning article, and wherein the heat generating agent is present in particulate form and is distributed in the interior of the fibrous structure in three dimensions and is fused to a low melting component of the fibrous structure.

2. A cleaning article according to claim 1, wherein the loading of the cleaning agent on the substrate is from 5 to 130 grams/m$^2$.

3. A cleaning article according to claim 2, wherein the loading of the cleaning agent on the substrate is from 10 to 90 grams/m$^2$.

4. A cleaning article according to claim 3, wherein the loading of the cleaning agent on the substrate is from 25 to 60 grams/m$^2$.

5. A cleaning article according to claim 4, wherein the loading of the cleaning agent on the substrate is from 30 to 50 grams/m$^2$.

6. A cleaning article according to claim 1, wherein the fixing agent is a binder selected from an acrylic latex, a styrene butadiene latex, a natural rubber based binder.

7. A cleaning article according to claim 1, wherein the fixing agent is a film-forming agent selected from polyvinyl alcohol, polyvinyl alcohol/vinyl acetate copolymers, and quaternary ammonium salts of polyvinylpyrrolidone/vinyl acetate copolymers.

8. A cleaning article according to claim 1, which article is a layered substrate which comprises at least a first non-woven web, a further non-woven microfiber web, and a second non-woven web.

9. A cleaning article according to claim 8, wherein the layered substrate further comprises a third non-woven web.

10. A packaged product comprising a substantially water-tight container and optionally further including a resealable opening said container containing a cleaning article according to claim 1
    and further wherein the container is arranged to accommodate the cleaning article in a dry environment until it is desired to employ the article in a cleaning operation.

11. A packaged product according to claim 10, wherein in the cleaning article the heat generating agent is entrained in the substrate such that it can be readily contacted by liquid water when desired and the heat generating agent generates heat as a result of a reaction with water.

12. A packaged product according to claim 10, wherein the cleaning article is such that it can be briefly dipped in a body of water and/or placed under running water for a brief period to initiate heat production.

13. A packaged product according to claim 10, wherein in the cleaning article the heat generating agent is entrained or impregnated within the substrate such that it remains attached thereto and is not deposited on an object during a cleaning operation.

14. A packaged product according to claim 10, wherein in the cleaning article the substrate is a woven or nonwoven sheet or a sponge.

15. A packaged product according to claim 10, wherein the cleaning article comprises from 1% to 80% by weight of heat generating agent.

16. A packaged product according to claim 10, wherein the surfactant is a germicidal cationic surfactant.

17. A packaged product according to claim 10, wherein the cleaning article is a non-woven wipe.

18. A packaged product according to claim 10, wherein in the cleaning article the heat generating agent is a dehydrated aluminosilicate.

19. A packaged product according to claim 10, wherein in the cleaning article the heat generating agent is a dehydrated zeolite.

20. A packaged product according to claim 10, wherein in the cleaning article the heat generating agent is bound to the substrate.

21. A packaged product according to claim 10, wherein the fixing agent is a binder selected from an acrylic latex, a styrene butadiene latex, a natural rubber based binder, or is a film-forming agent selected from polyvinyl alcohol, polyvinyl alcohol/vinyl acetate copolymers, and quaternary ammonium salts of polyvinylpyrrolidone/vinyl acetate copolymers.

* * * * *